(12) United States Patent
Zhang et al.

(10) Patent No.: US 11,394,076 B2
(45) Date of Patent: Jul. 19, 2022

(54) BATTERY PACK WITH A PLURALITY OF BATTERY CELLS

(71) Applicant: Lithium Power Inc., San Jose, CA (US)

(72) Inventors: Zhixian Zhang, Jinan (CN); Chit Fung Wylie So, Hong Kong (HK)

(73) Assignee: Lithium Power Inc., San Jose, CA (US)

( * ) Notice: Subject to any disclaimer, the term of this patent is extended or adjusted under 35 U.S.C. 154(b) by 1 day.

(21) Appl. No.: 17/022,041

(22) Filed: Sep. 15, 2020

(65) Prior Publication Data

US 2022/0085346 A1    Mar. 17, 2022

(51) Int. Cl.
*H01M 50/20* (2021.01)
*H01M 10/6554* (2014.01)
*H01M 50/30* (2021.01)
*H01M 10/42* (2006.01)

(52) U.S. Cl.
CPC ........ *H01M 50/20* (2021.01); *H01M 10/425* (2013.01); *H01M 10/6554* (2015.04); *H01M 50/30* (2021.01); *H01M 2010/4271* (2013.01)

(58) Field of Classification Search
CPC .. H01M 50/20; H01M 50/30; H01M 10/6554; H01M 10/42–425
See application file for complete search history.

(56) References Cited

U.S. PATENT DOCUMENTS

| | | | | |
|---|---|---|---|---|
| 2012/0057316 A1* | 3/2012 | Kaneshige | .......... | H01M 10/425 361/752 |
| 2014/0154535 A1* | 6/2014 | Olsson | ................ | H01M 50/394 429/53 |
| 2016/0093843 A1* | 3/2016 | Reineccius | ......... | H01M 10/052 429/61 |

\* cited by examiner

*Primary Examiner* — Karie O'Neill Apicella
(74) *Attorney, Agent, or Firm* — Wang Law Firm, Inc.

(57) ABSTRACT

A battery with a plurality of battery cells disposed on a plurality of cell holders. Each battery cell holder holds two battery cells. The plurality of cell holders with the battery cells are enclosed in a battery case and placed inside an external case with a top cover.

9 Claims, 10 Drawing Sheets

BATTERY PACK WITH A PLURALITY OF BATTERY CELLS

FIELD OF THE INVENTION

The present invention generally relates to battery, and more specifically relates to an assembly of battery pack with a plurality of battery cells.

SUMMARY OF THE INVENTION

The present invention introduces a battery composed from a plurality of battery cells. A battery comprises a plurality of battery cells, a plurality of cell holders, each cell holder holding at least two battery cells, a battery cage enclosing the plurality of cell holders, a battery management circuit board is disposed on top of the battery cage, an external case in which the battery cage with the plurality of the cells holders is placed, and a top case placed on top of the external case for sealing the battery cage. Each cell holder comprises a frame chassis with two opposing frame walls, at least part of a frame wall is located below the frame chassis.

DETAIL DESCRIPTION OF THE INVENTION

Figure 1:
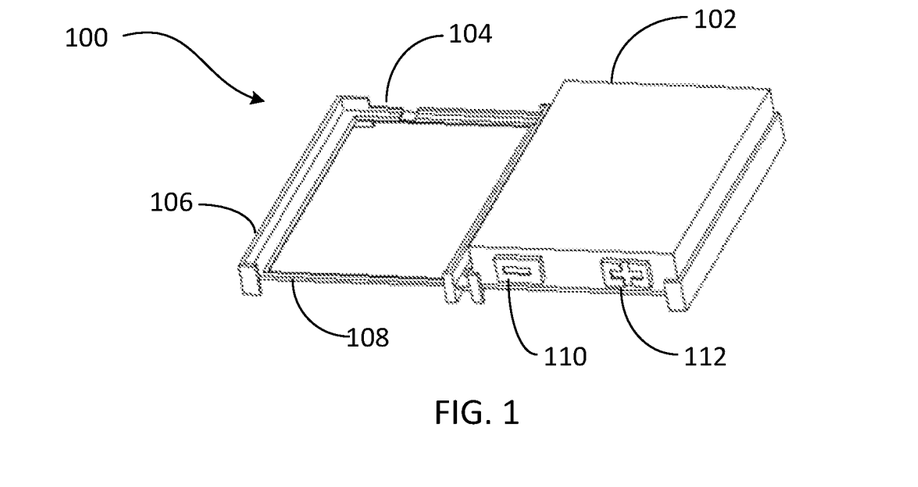
FIG. 1 is an illustration 100 of basic elements for the assembly of the battery.

The present invention introduces a novel way to assemble a battery from a plurality of battery cells. FIG. 1 is an illustration 100 of basic elements for the assembly of the battery. A basic unit consists of a battery cells 102 placed on a unit frame (cell holder) 104. Each battery cell 102 has one positive connector 112 and one negative connector 110. The cell holder 104 has a chassis 108 and two side walls 106. The chassis 108 is placed in the middle of two walls 106 in such way that one half of the side walls 106 is above the chassis 108 and other half of the side walls 106 is below the chassis 108. The side walls 106 also extend onto the front and the back of the chassis 108. When the battery cells 102 are placed on the cell holder 104, the battery cells 102 are enclosed by the side walls 106. The cell holder 104 is preferably made from non-metallic material such as acrylonitrile butadiene styrene (ABS).

Figure 2:
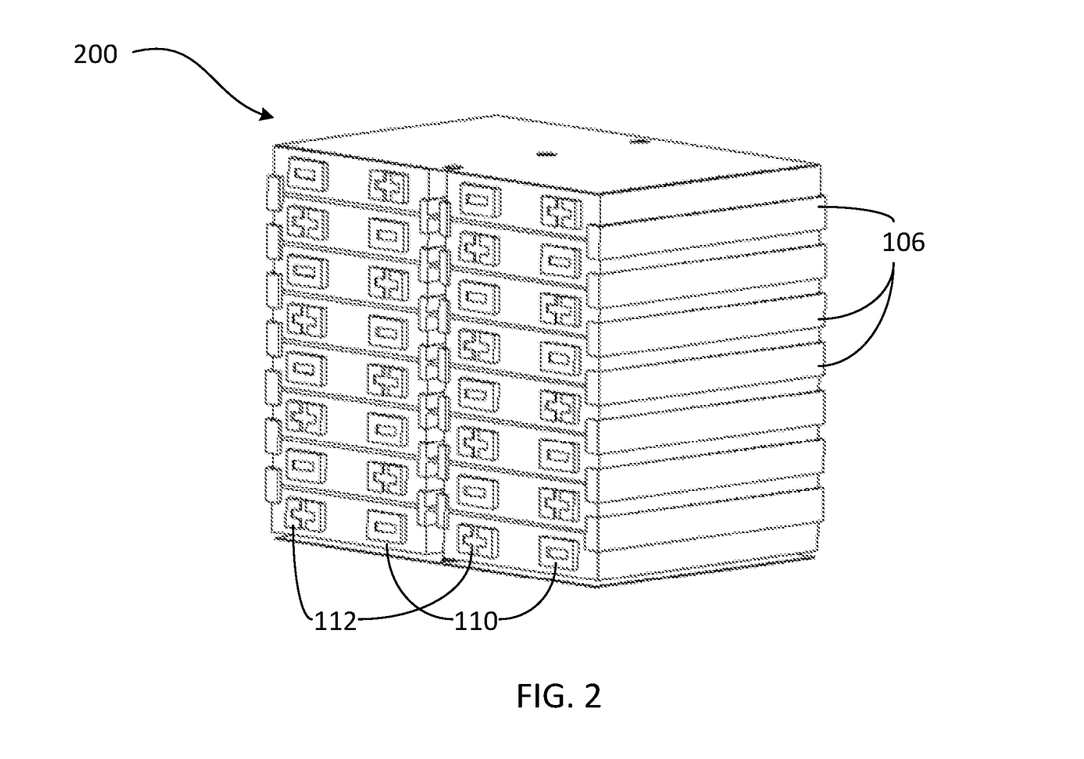
FIG. 2 is an illustration 200 of an assembled battery pack.

FIG. 2 is an illustration 200 of an assembled battery pack. The cell holders 104 with the battery cells 102 are stacked up one on top of other and the side walls 106 help to maintain the alignment. The external connectors of each battery cell 102 are preferably not vertically aligned, i.e., a negative connector 110 should be on top of a positive connector 112. This alignment ensures the battery cells are easily connected in series. If it is preferred that the battery cells to be connected in parallel, then the connectors of the same polarity can be placed on top of each other. The number of the layers of the cell holders stacked together is adjustable.

Figure 3:
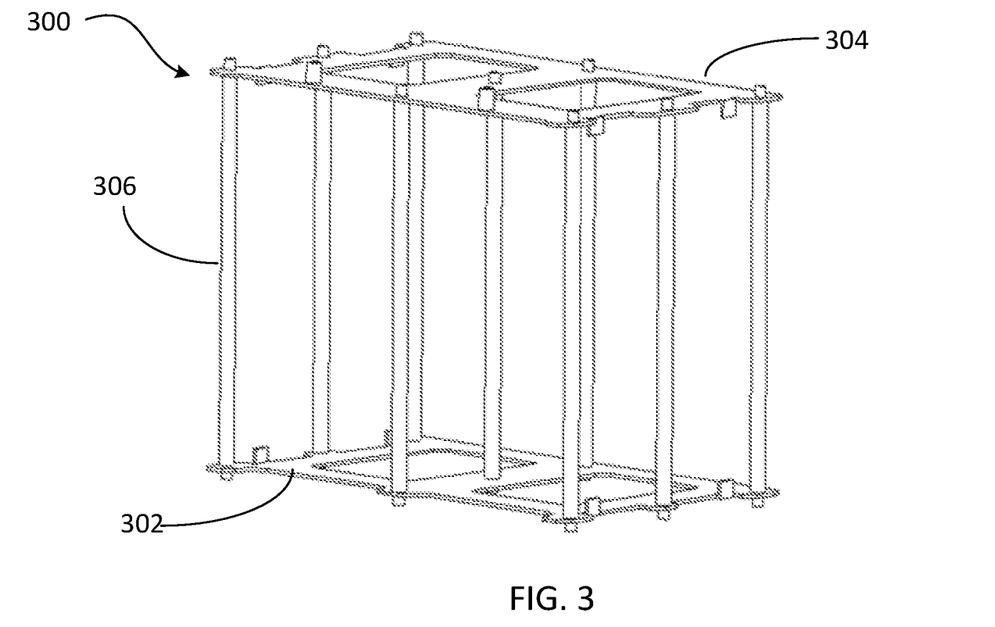
FIG. 3 shows a battery cage 300.
Figure 4:
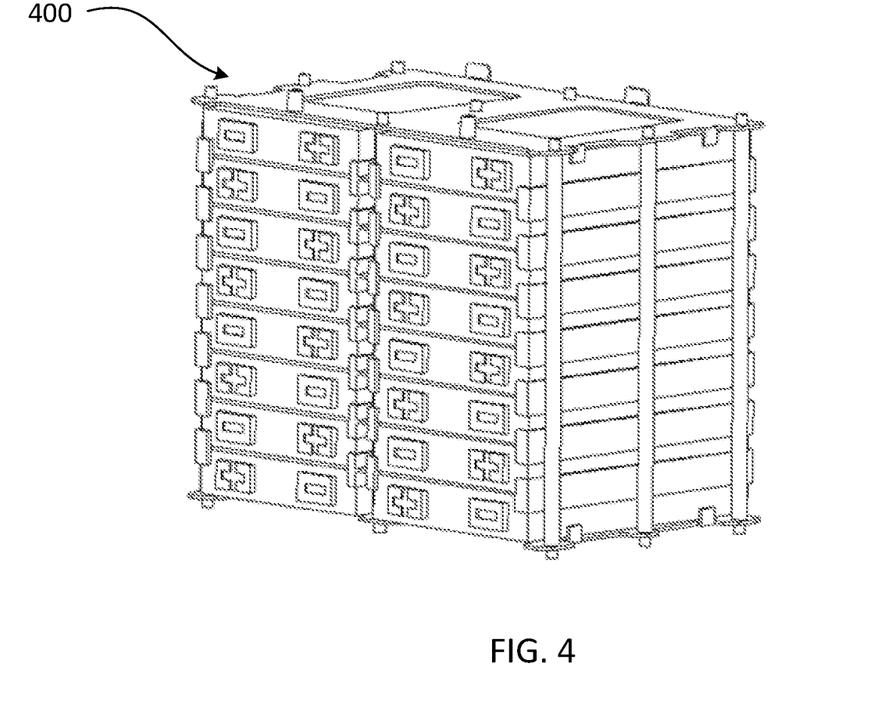
FIG. 4 is an illustration of an assembled battery cage 400.
Figure 5:
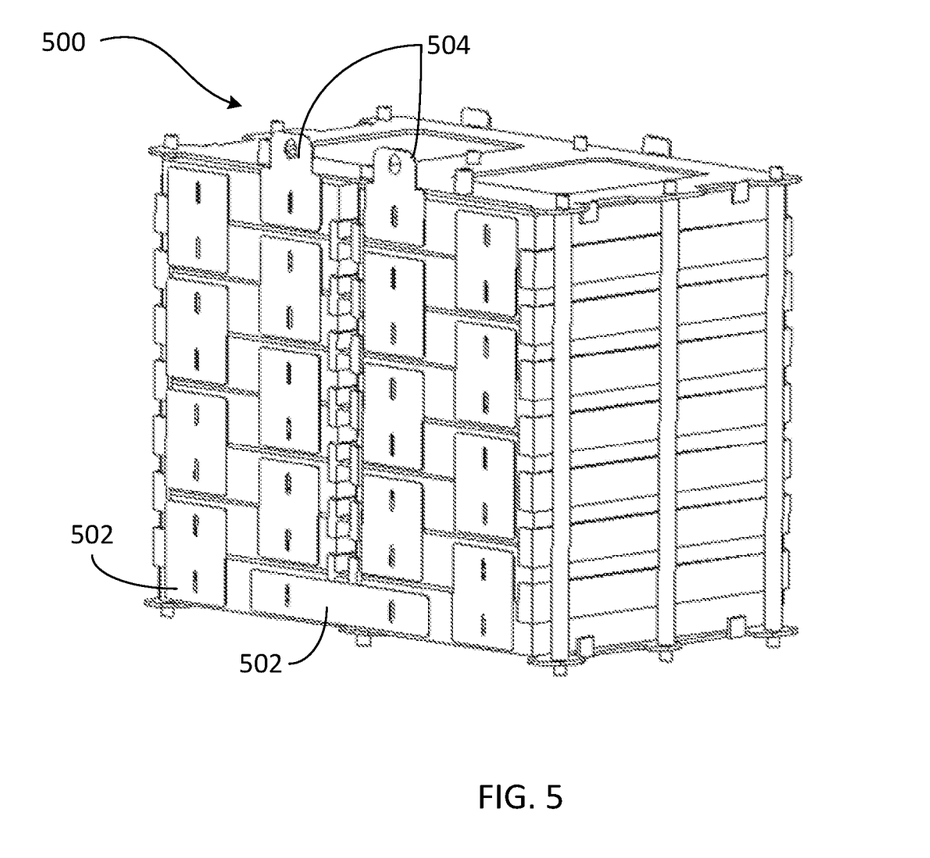
FIG. 5 is an illustration 500 of a core battery with battery cells connected in series.

The stacked cell holders can be further enclosed by a battery cage 300 as shown in FIG. 3. The battery cage 300 has a cage base 302, a cage top 304 and a plurality of cage supports (rods) 306 securing both the cage base 302 and the cage top 304. The battery cage 300 is made from metallic material. FIG. 4 is an illustration of an assembled battery cage 400. The number of the layers of cell holder 104 enclosed in the assembled battery cage 400 can be adjusted. FIG. 5 is an illustration 500 of a core battery with battery cells connected in series. The adjacent battery cells 102 are connected through connectors 502. For the connection in series, adjacent connectors of different polarities are connected together and the external connectors 504 at the end of the serial connection are exposed.

Figure 6:
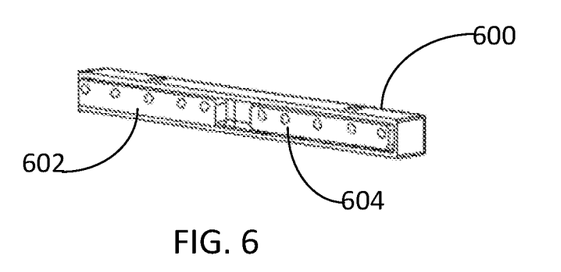
FIG. 6 is an illustration of a current collector bus bar 600.
Figure 7:
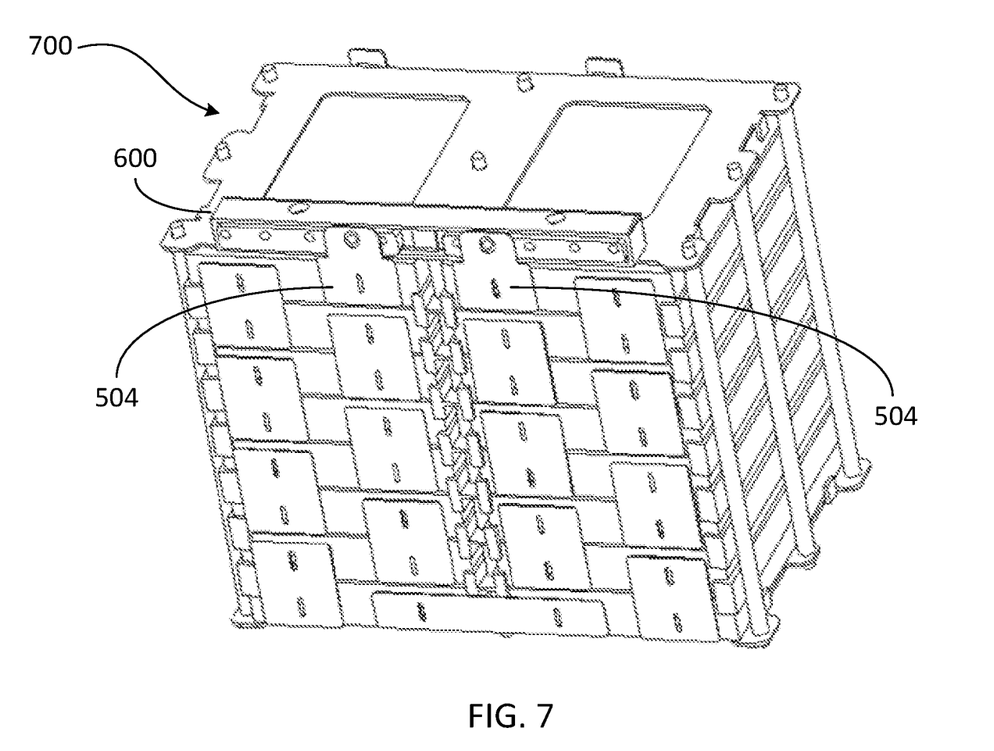
FIG. 7 shows an assembled battery pack 700 with the connector bar.

FIG. 6 is an illustration of a current collector bus bar 600, which has two electric connectors 602, 604 for connecting connectors of different polarities. FIG. 7 shows an assembled battery pack 700 with the connector bar. As it is shown in FIG. 7, the external connectors 504 are connected to two different electric connectors 602, 604.

Figure 8:
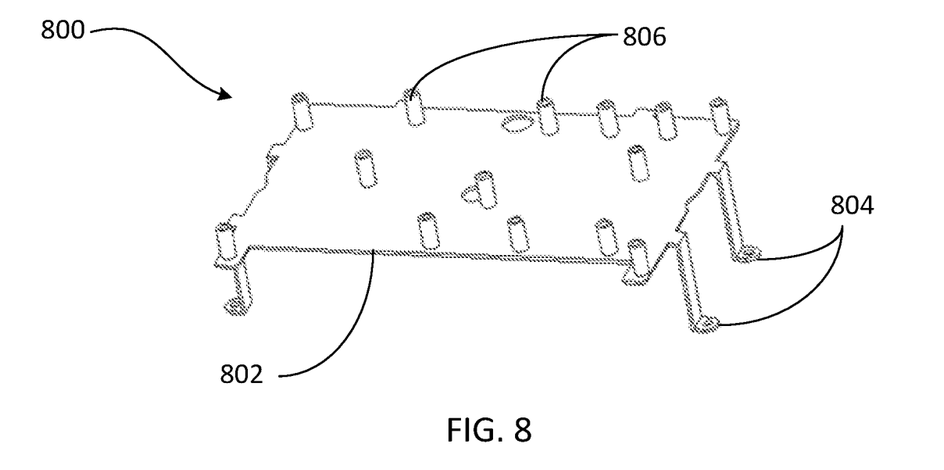
FIG. 8 is an illustration of an upper battery bracket 800.
Figure 9:
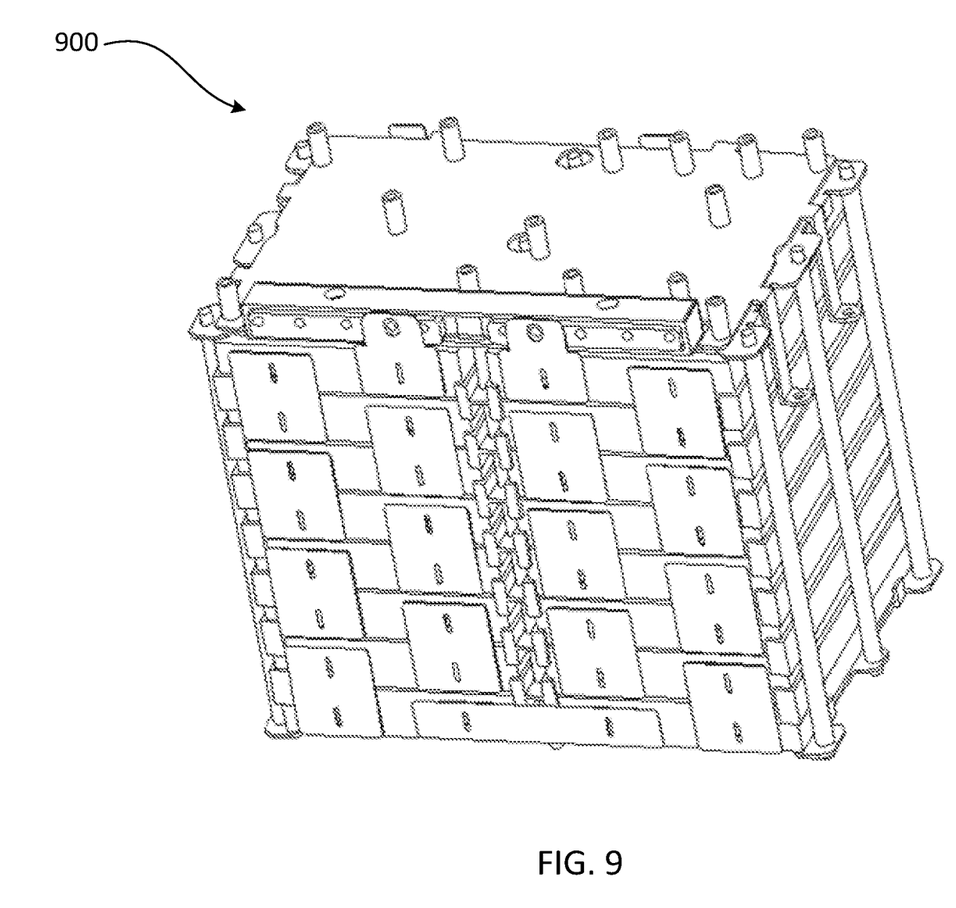
FIG. 9 is an illustration 900 of the assembled battery pack with the upper battery bracket 800.
Figure 10:
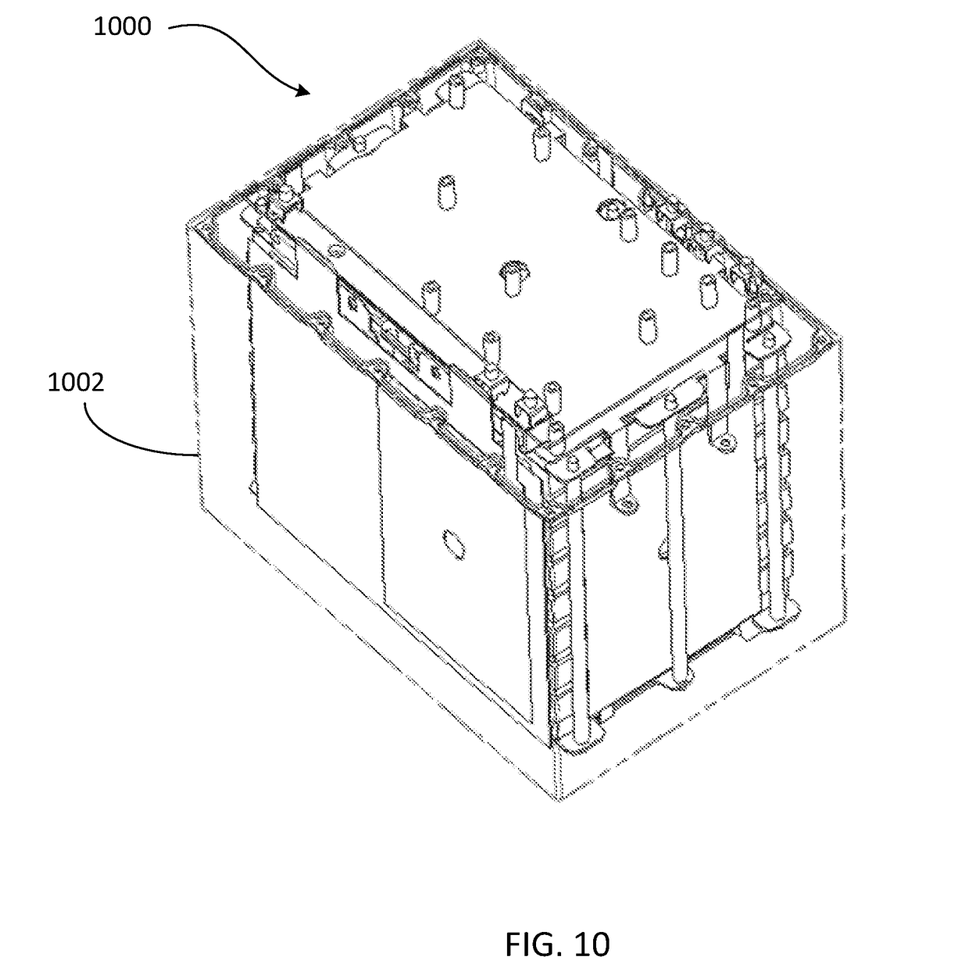
FIG. 10 shows an assembled battery pack inside an external case 1002.

FIG. 8 is an illustration of an upper battery bracket 800. The upper battery bracket 800 has a base 802 with a plurality of base top supports 806 and additional base inferior supports 804. The upper battery bracket 800 is mounted on the top of the assembled battery pack 700. FIG. 9 is an illustration 900 of the assembled battery pack with the upper battery bracket 800. A battery management circuit board 1104 is placed on top of the upper battery bracket 800. The battery management circuit board has direct connections (not shown) to each battery cells and through these connections the battery management circuit board receives status information of each battery cell. The assembled battery pack shown in FIG. 9 is then placed into an external case 1002 as shown in FIG. 10. Note that the external case 1002 is shown as "see-through" for the illustration purpose and many structural features have been omitted for simplicity of the illustration. The external case 1002 is made from ABS.

Figure 11:
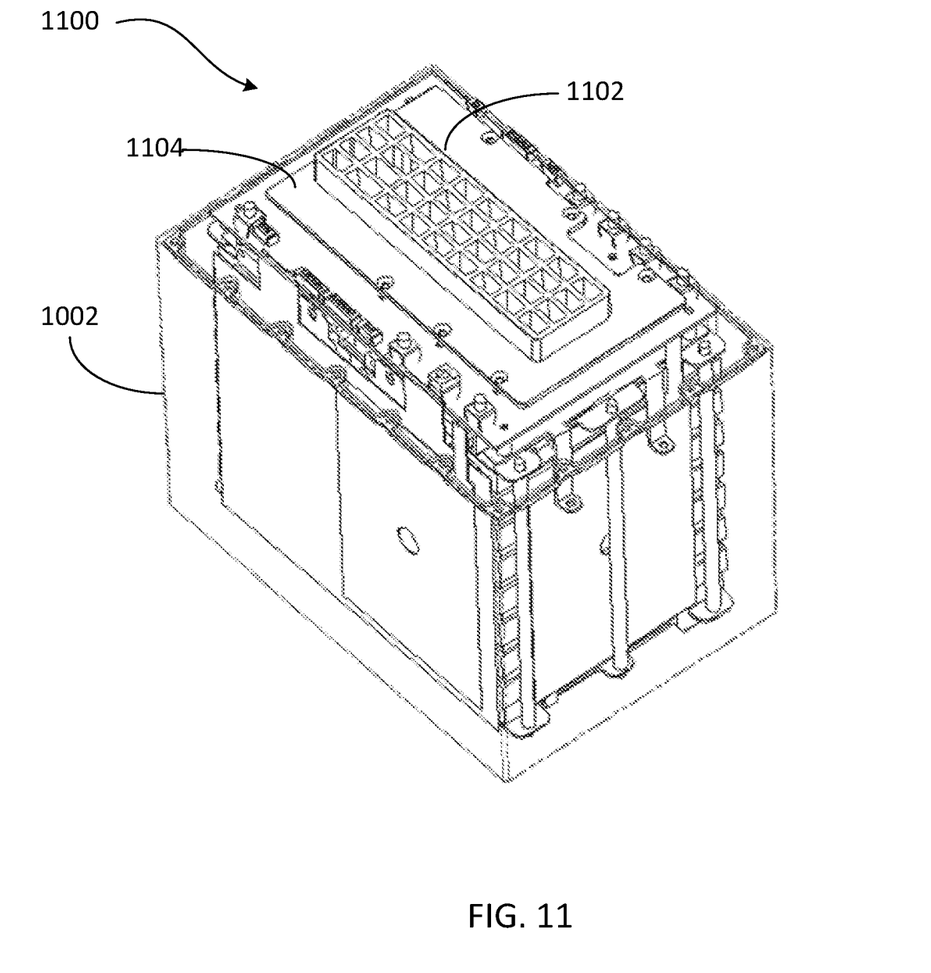
FIG. 11 is an illustration 1100 of an assembled battery pack with a heat sink 1102.
Figure 12:
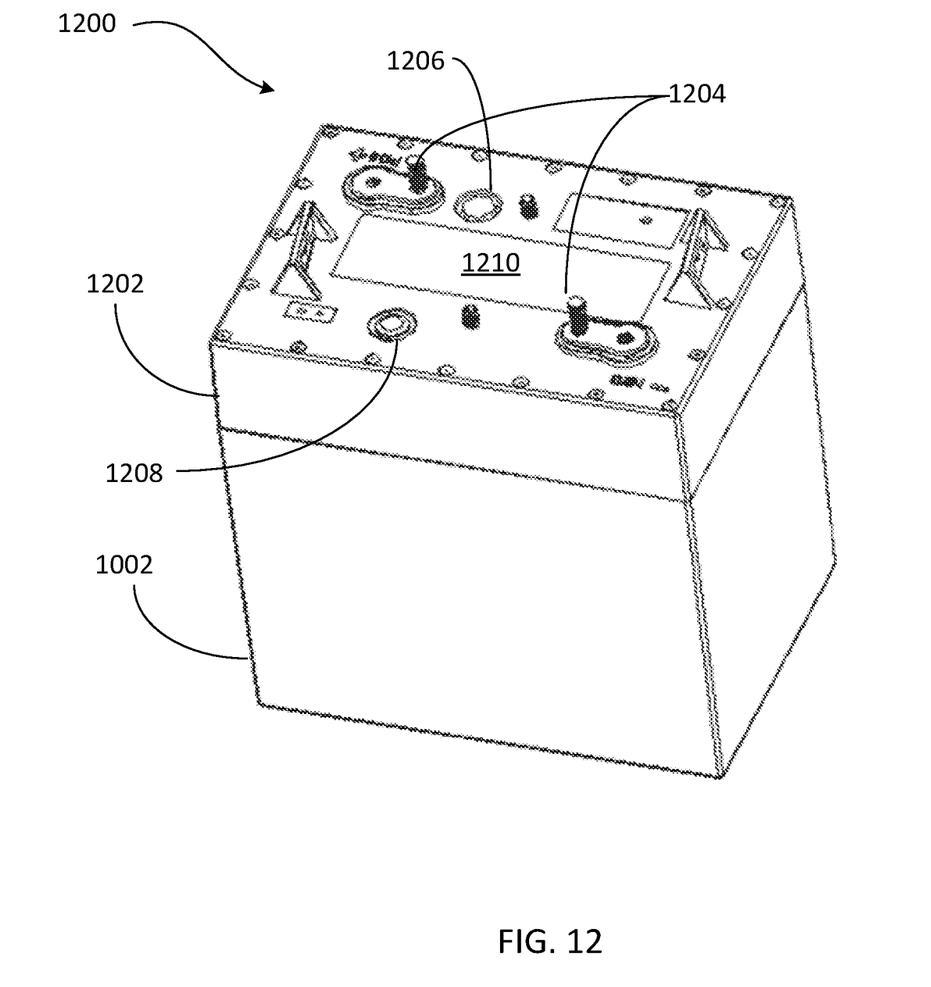
FIG. 12 shows a finished battery 1200.
Figure 14:
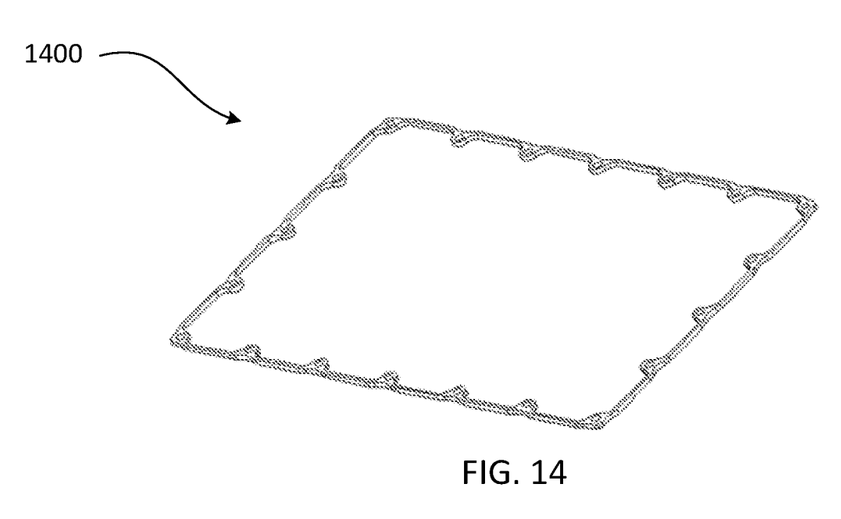
FIG. 14 shows a sealing ring 1400.

FIG. 11 is an illustration 1100 of an assembled battery pack with a heat sink 1102 mounted on top of the battery management circuit board. The heat sink 1102, preferably made from aluminum, is mounted on a battery management circuit board 1104 that is mounted on the upper battery bracket 800. The heat sink 1102 conducts heat away from the battery management circuit board 1104, thus preventing the overheating. FIG. 12 shows a finished battery 1200, which is the assembled battery pack shown in FIG. 11 enclosed with a battery top cover 1202. The battery 1200 has two external connectors 1204 and a heat exchange plate 1210. The heat exchange plate 1210 is in communication with the heat dissipator (heat sink) 1102 and enables the heat exchange between the battery management circuit board 1104 and the external environment. The heat exchange plate 1210 has a coating that provides electrical isolation. The battery 1200 is hermetically sealed through use of a sealing ring 1400 shown in FIG. 14. The sealing ring 1400 prevents water and dust from getting inside of the battery. There are a button 1208 and a valve 1206 on top of the battery 1200.

Figure 13:
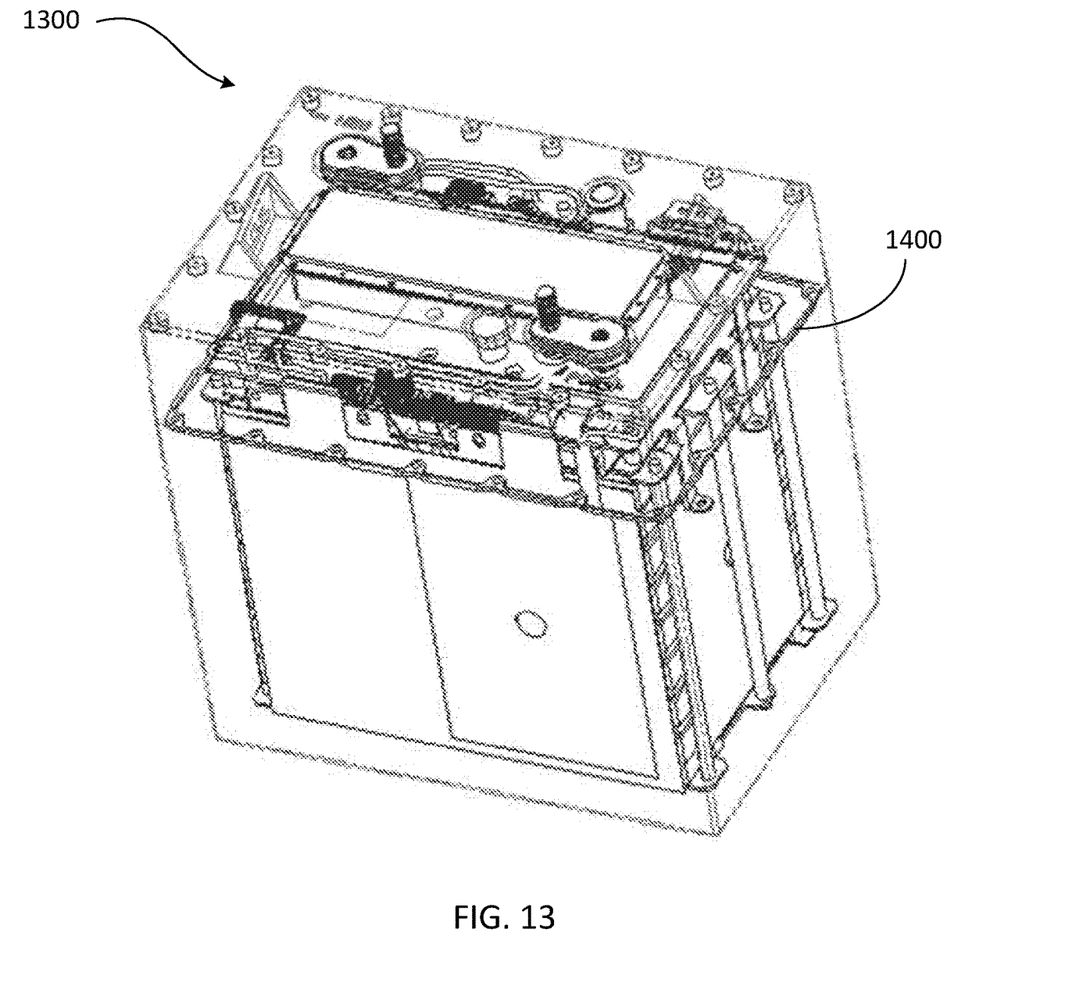
FIG. 13 is a see-through illustration 1300 of an assembled battery.

The button 1208 is the ON/OFF switch for the battery 1200 and the valve 1206 is a re-settable pressure release valve for releasing the internal pressure of the battery 1200. If the battery cells are overheated, the pressure builds up inside the battery packaging. When the pressure reaches a predetermined point, the pressure release valve pops up and the internal pressure is released. FIG. 13 is a see-through illustration 1300 of an assembled battery. After the battery case is closed, the top cover 1202 is tightened to the bottom case 1002 with screws. The screws are distributed evenly along the edge of the assembled battery case. Since the sealing ring 1400 is located between the top cover 1202 and the bottom case 1002 and made from rubber, the sealing ring 1400 is subjected to compression and the compression ration can be controlled. After the assembly the battery is a close system, radiation and convection for heat dissipation from internal to external is minimal. The embedded heat exchange plate 1210 is an effective medium to enhance conduction for heat dissipation. A compression force apply to the sealing ring 1400 evenly. This even-force is important for sealing, the distance between the points where the force is not randomly selected. The compression ratio of sealing ring is not random too.

Exemplary embodiments are described above. It will be understood that the present invention comprises many other embodiments that may be considered reasonable equivalents to the embodiments described above, and is limited only by the appended claims.

The invention claimed is:

1. A battery comprising:
   a plurality of battery cells;
   a plurality of cell holders, each cell holder holding at least two battery cells placed side-by-side;
   a battery cage enclosing the plurality of cell holders;
   a battery management circuit board is disposed on top of the battery cage;
   a heat sink mounted on top of the battery management circuit and in contact with the battery management circuit, the heat sink being made from a plurality of lattices;
   an external case in which the battery cage with the plurality of the cells holders is placed inside;
   a top case placed on top of the external case for sealing the battery cage; and
   a heat exchange plate, in contact with the heat sink, placed on top of the top case,
   wherein
   each cell holder comprises a frame chassis with two opposing frame walls, at least part of a frame wall is located below the frame chassis.

2. The battery of claim 1 further comprising a current collector bus placed above the battery cage and connected to the plurality of battery cells.

3. The battery of claim 2, wherein each battery cell has two connectors of opposite polarity and two connectors of opposite polarity of two adjacent battery cells are connected by a connector and the plurality of battery cells are connected to the current collector bus through two external connectors.

4. The battery of claim 1 further comprising an upper battery bracket disposed on top of the battery cage for supporting the battery management circuit board, the upper battery bracket having a base with a plurality of top supports extending away from the plate and a plurality of lower supports extending away, in an opposite direction of the top supports, from the base.

5. The battery of claim 1, wherein the battery cage further comprises a cage top, a cage base, and a plurality of rods for connecting the cage top to the cage base.

6. The battery of claim 1 further comprising a re-settable pressure release valve disposed on top of the top case for releasing internal pressure of the battery.

7. The battery of claim 1 further comprising an ON/OFF switch disposed on top of the top case.

8. The battery of claim 1 further comprising a sealing ring disposed between the external case and the top cover for sealing hermetically the battery.

9. The battery of claim 1 wherein the heat exchange plate having an isolation coating to prevent short circuit.

* * * * *